United States Patent [19]

Ackeret

[11] Patent Number: 4,571,865
[45] Date of Patent: Feb. 25, 1986

[54] CONTAINER FOR A STACK OF PICTURES

[75] Inventor: Peter Ackeret, Küsnacht, Switzerland

[73] Assignee: Licinvest AG, Chur, Switzerland

[21] Appl. No.: 537,530

[22] Filed: Sep. 30, 1983

[30] Foreign Application Priority Data

Oct. 4, 1982 [DE] Fed. Rep. of Germany ....... 3236644

[51] Int. Cl.⁴ .............................................. G09F 3/18
[52] U.S. Cl. .................................... 40/10 R; 40/122; 40/513
[58] Field of Search .................... 40/10, 513, 122, 358, 40/490, 511, 152

[56] References Cited

U.S. PATENT DOCUMENTS

| | | | |
|---|---|---|---|
| 2,919,509 | 1/1960 | Strandberg | 40/63 |
| 3,377,727 | 4/1968 | Weggeland | 40/511 |
| 3,546,802 | 12/1970 | Preston | 40/152 |
| 3,782,015 | 1/1974 | Esry | 40/152 |
| 3,878,632 | 4/1975 | Berggren et al. | 40/152 |
| 4,057,920 | 11/1977 | Weggeland | 40/79 |
| 4,173,838 | 11/1979 | Antos | 40/366 |
| 4,238,899 | 12/1980 | Ackeret | 40/513 |
| 4,241,528 | 12/1980 | Ackeret | 40/513 |
| 4,241,529 | 12/1980 | Baur | 40/513 |
| 4,242,817 | 1/1981 | Ballard | 40/152.1 |
| 4,242,820 | 1/1981 | Ackeret | 40/490 |
| 4,245,417 | 1/1981 | Ackeret | 40/513 |
| 4,259,802 | 4/1981 | Ackeret | 40/513 |
| 4,376,348 | 3/1983 | Ackeret | 40/490 |
| 4,413,435 | 11/1983 | Baur | 40/155 |
| 4,458,434 | 7/1984 | Ackeret | 40/490 |

FOREIGN PATENT DOCUMENTS

| | | |
|---|---|---|
| 1772198 | 1/1971 | Fed. Rep. of Germany . |
| 2212135 | 11/1972 | Fed. Rep. of Germany . |
| 2457759 | 6/1976 | Fed. Rep. of Germany . |
| 2742345 | 3/1979 | Fed. Rep. of Germany . |
| 2833410 | 2/1980 | Fed. Rep. of Germany . |
| 3014394 | 10/1981 | Fed. Rep. of Germany . |
| 3236643 | 5/1984 | Fed. Rep. of Germany ..... 40/10 R |
| 2265116 | 10/1975 | France . |
| 490390 | 2/1954 | Italy . |
| 1059689 | 2/1967 | United Kingdom . |
| 2088337 | 6/1982 | United Kingdom . |

*Primary Examiner*—Gene Mancene
*Assistant Examiner*—Wenceslao J. Contreras

[57] ABSTRACT

A container for a stack of a variable number of pictures is disclosed. The container comprises at least two members movable relative to each other, one of which members holds the stack at at least one but not all of its edges, permitting the stack to be removed in the direction of one of the non-embraced edges.

24 Claims, 36 Drawing Figures

CONTAINER FOR A STACK OF PICTURES

BACKGROUND OF THE INVENTION

The invention relates to containers for storing pictures. A container of this general type is disclosed in my U.S. Pat. No. 4,242,820, issued Jan. 6, 1981.

Known containers of the above-mentioned type typically have a display window and transverse walls extending orthogonally with respect to the display window. The transverse walls support at least one picture, presented at the window, in the picture's lateral position (hereinafter, "picture alignment"). According to the teaching of the patent referred to above, a biasing device is used to hold the stack flat against the window and is deactivated upon opening of the container, so that the stack of pictures can be removed easily. If, however, the pictures are removed in a direction perpendicular to the plane of the pictures, and if there is a small spacing between the picture alignment walls and the picture edges, the stack can be disordered and the pictures may be damaged during removal.

It is an object of the present invention to provide a container for storing a stack of pictures designed so that pictures can be inserted and removed without the risk of damaging or disordering them.

SUMMARY OF THE INVENTION

A container for accommodation of one or more pictures is provided. The container has a housing member and a second member relatively movable with respect to each other between an open and a closed position. When the two members are in the open position, a stack of pictures is supported at at least one edge by a bracket or other support device constituting part of the second member, and is removable in the direction of one edge of the stack that is not supported by either member. The picture-support device is shaped to limit movement of the stack in either direction perpendicular to the planes of the pictures in the stack. A device is provided for holding the stack against a display window provided in one of the members, either resiliently or adhesively.

DETAILED DESCRIPTION OF THE PREFERRED EMBODIMENTS

A first preferred embodiment of the container is illustrated in FIGS. 1-4. The container comprises an outer frame-shaped housing 50 having a display window 52 which can, if desired, be provided with a pane. The housing 50 and second member 54 are integrally injection molded of a material having resilient properties. The two members 50 and 54 are connected to each other by means of a pivot 56 or hinge which is also integrally formed with housing 50 and member 54. In the open position of the container, shown in FIG. 1, member 54 is rotated away from housing 50, while in the closed position, shown in FIG. 2, member 54 fits into housing 50. The container is locked in its closed position by means of a locking hook 64 engaging an opening 66 in housing member 50. In the present embodiment, three locking hooks 64 and openings 66 are provided. Finger openings or recesses 70 in the edge of member 54 opposite pivot 56 permit the locks 64 to be disengaged from openings 66 by means of the finger tips.

The member 54 comprises two integrally formed angular shanks 58 extending from one side of member 54. The angular shanks 58 embrace and hold between them two opposite longitudinal edges of a stack 60 of pictures. The angles of shanks 58 prevent the stack 60 from being removed except by movement parallel to the stack's longitudinal edges. In the closed position (FIG. 2), the stack 60 is urged against the display window 52 by biasing elements, such as leaf springs 62. The leaf springs 62 are each roughly arcuate, with the middle part of each attached to member 54 between the two shanks 58, and with the ends of the springs bent back slightly toward member 54.

Figures 1, 3, 4:
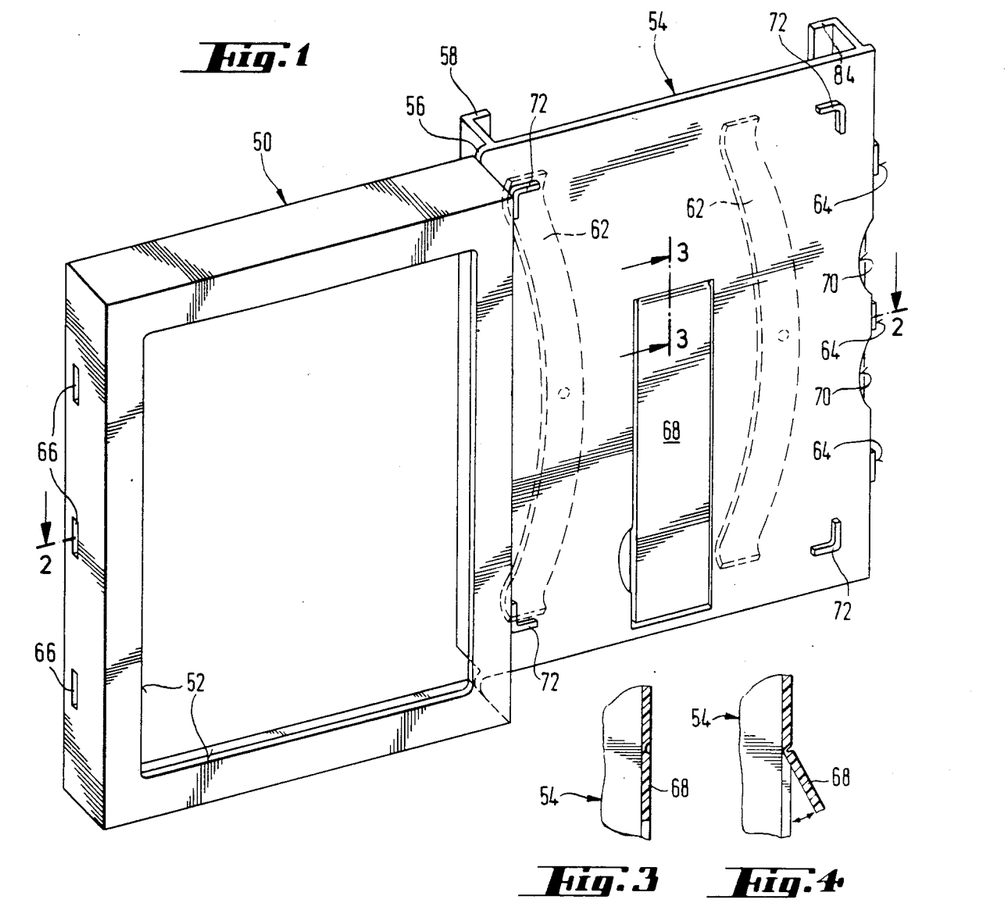
FIG. 1 is an isometric view of a first preferred embodiment, showing the container open.
FIGS. 3 and 4 show a detail of a stand-up foot used in the first embodiment.
Figure 2:
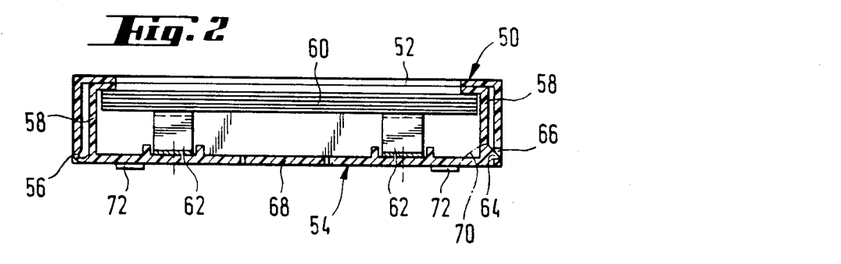
FIG. 2 is an end view, in section, of the container of the first embodiment, showing it closed.

The container has at the rear side of member 54 an integrally molded stand-up foot 68 permitting use of the container in a convenient inclined position in a longitudinal as well as in a transverse position on a horizontal surface.

Four positioning corners 72 provided on the outer side of member 54 fit into the window opening 52 of a similar container, permitting the containers to be piled up to form a stack if desired.

Figure 5:
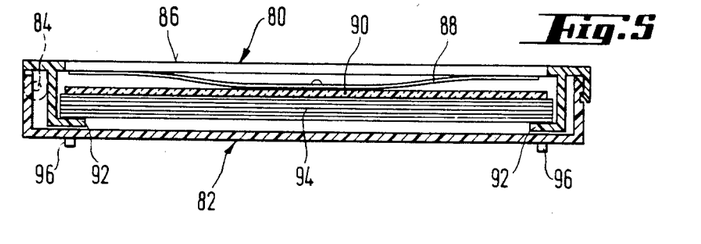
FIG. 5 is a side view, in section, showing a second preferred embodiment in a closed position.
Figure 6:
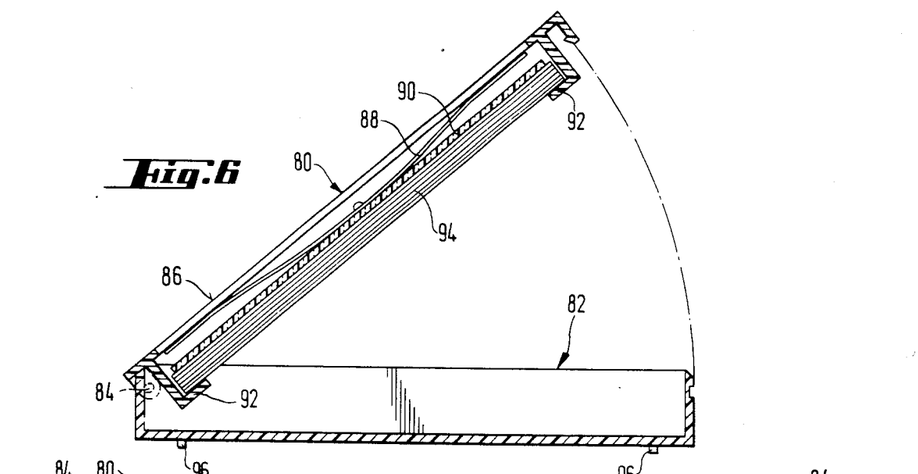
FIG. 6 is a sectional side view showing the second embodiment in an open position.
Figure 7:
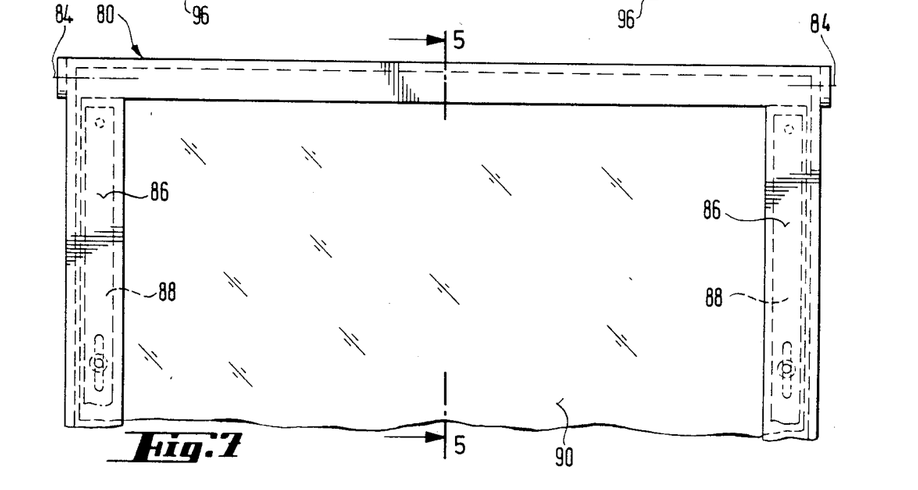
FIG. 7 is a top plan of a portion of the second embodiment.

FIGS. 5–7 show a second preferred embodiment. The container housing comprises two separately manufactured members, a window member 80 and a lid member 82 (FIG. 6), which are connected by means of a pivot 84. The window member 80 when seen from above has the form of a frame (FIG. 7). On its inner side (as shown in FIG. 6, its lower side), window member 80 has two opposing frame shanks 86 adjacent to opposite edges of the window, and leaf springs 88 beneath the shanks 86. Downward extending arches of leaf springs 88 are connected to a pane 90, made of a transparent material such as a transparent polystyrene material, and urge pane 90 downward against a stack 94 of pictures. The stack 94 is supported by rails 92, like the angular shanks 58 of the embodiment of FIGS. 1–4, which are integrally formed with the window member 80 and embrace two edges of the back (i.e., the non-picture side) of the pictures in stack 94, holding stack 94 in window member 80. Positioning elements 96, like positioning corners 72 in the embodiment of FIGS. 1–4, are provided on the outer of lower surface of member 82, for stacking two or more such containers together.

Figure 8:
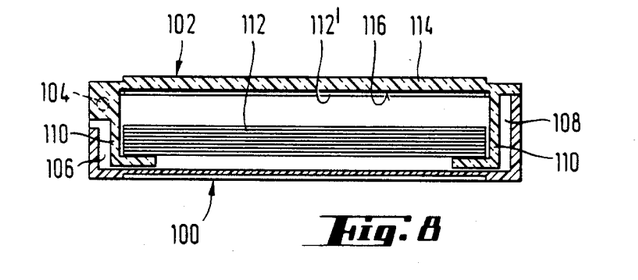
FIG. 8 is an end view, in section, of a third preferred embodiment.
Figure 9:
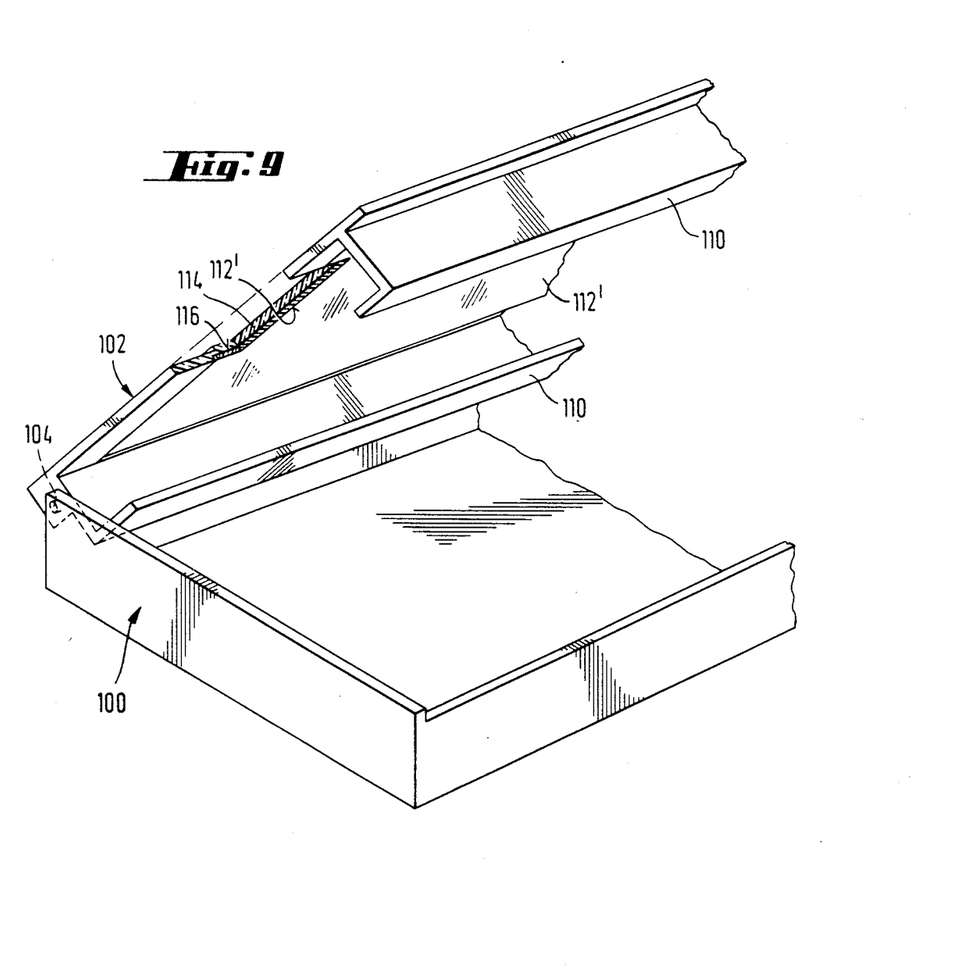
FIG. 9 is an isometric view, with a portion cut away, of part of the third embodiment in an open position.

FIGS. 8 and 9 illustrate a third preferred embodiment. A box-like bottom member 100 and a removal member 102 are pivotally attached at 104. Free spaces 106 and 108 permit the pivotal movement without interference between members 100 and 102. Angles or support rails 110 are integrally formed with the removal member 102 on the underside thereof and serve as a support for a stack 112 of pictures, which permit easy removal of the pictures from the container as described below. After pivoting the two members 100 and 102 away from each other to the open position, stack 112 can be easily grasped and withdrawn at the accessible stack edge, i.e, at the left side of the container as shown in FIG. 9. The biasing or retention means for holding one picture 112' of the stack against window 114 of removal member 102 is a transparent bonding layer 116 of a type, readily available on the market, that suffices to hold a picture 112' against the window while permitting the damage free removal of picture 112' and the following disposition of another picture without either the picture or the bonding layer being subject to deterioration. This permits very simple container designs.

Figures 10, 11:
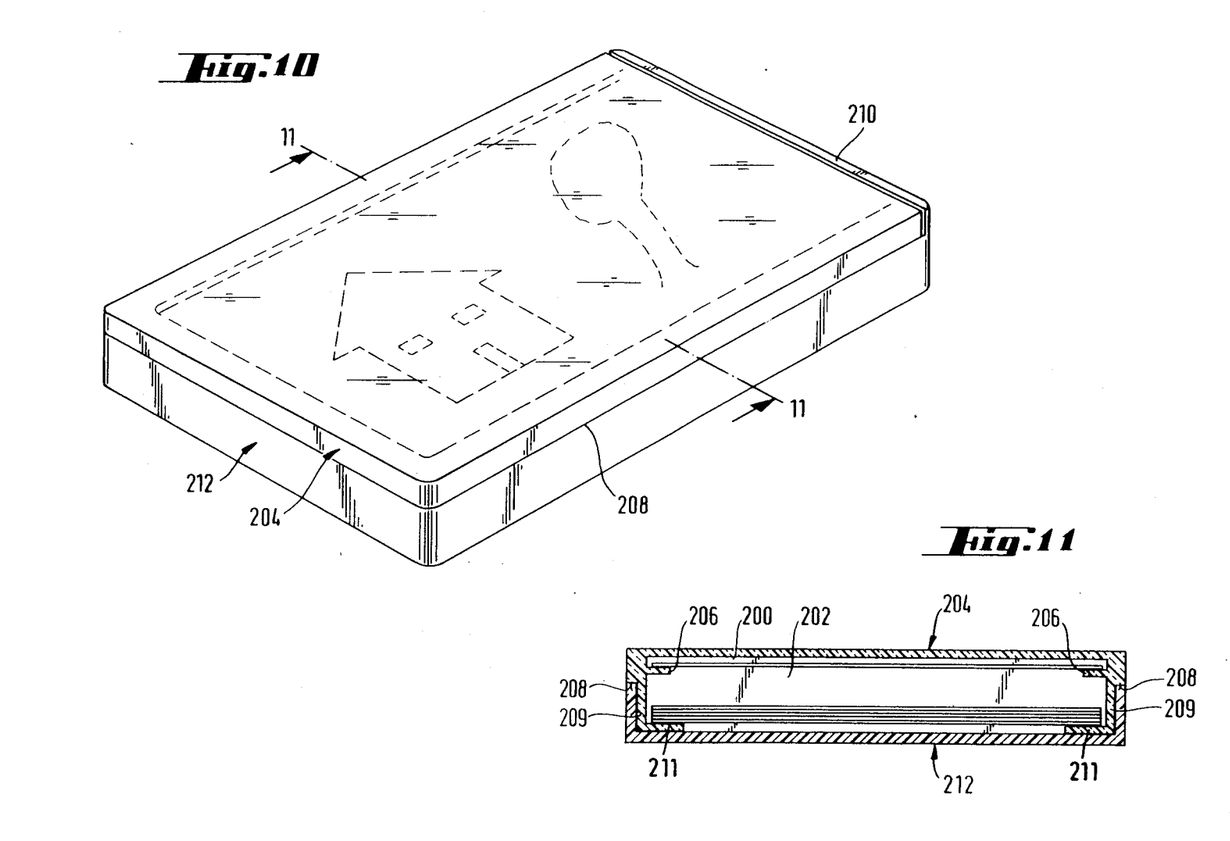
FIG. 10 is an isometric view of a fourth preferred embodiment.
FIG. 11 is an end view, in section, of the fourth embodiment.

FIGS. 10 and 11 illustrate a fourth preferred embodiment. A shallow chamber 200 and a deeper chamber 202 are defined in a first member 204 and are separated from each other by integrally formed rails 206 which serve as biasing or retention means for a displayed picture, whose image-bearing surface is indicated in phantom (FIG. 10). An edge 209, having a step 208 formed in its outer periphery, depends from the upper part of member 204 and extends around three narrow sides of member 204, defining the lower part of chamber 202. The fourth side of chambers 200 and 202 is covered by an upstanding wall 210 of a second member 212 having the shape of an upwardly open box fitting over and frictionally mating with peripheral step 208. Picture-support elements 211 are angled from opposite edges 209 and support transverse edges of a stack of pictures. The outer faces of members 204 and 212 are flush, forming a straight side edge (FIG. 11).

Figures 12, 13:
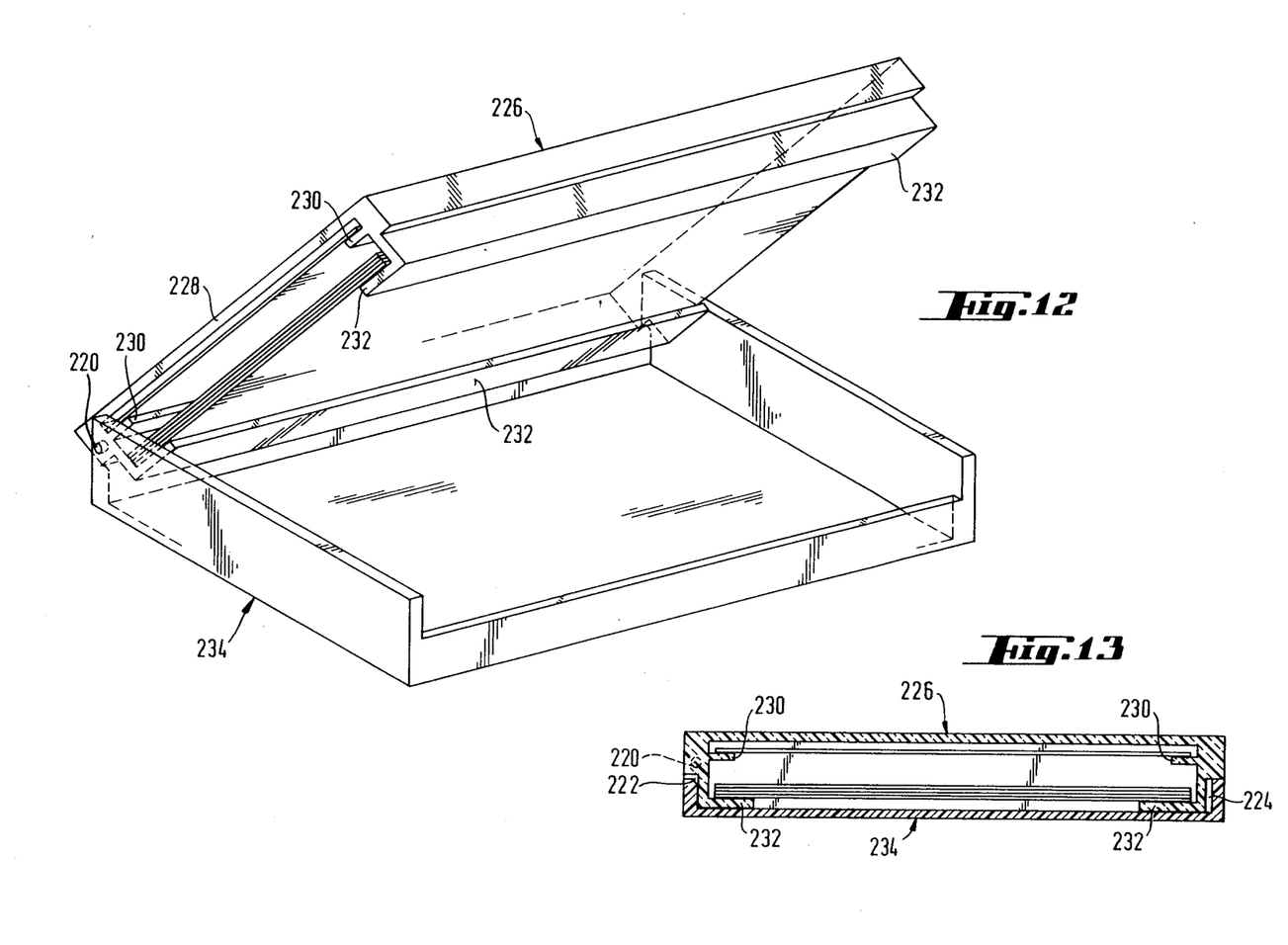
FIG. 12 is an isometric view of a fifth preferred embodiment.
FIG. 13 is an end view, in section, of the fifth embodiment.

FIGS. 12 and 13 show a fifth preferred embodiment similar to the embodiment of FIGS. 10 and 11. A first member 226 and a second member 234 are connected at pivot 220. Free spaces 222 and 224 permit the relative pivoting movement of members 226 and 234 without interference. Member 226 is integrally formed with and comprises window 228, partition elements 230, and a clamp 232 which embraces the stack of pictures. Partition elements 230 serve as biasing or retention means for holding a picture in front of window 228. When the container is in the closed position shown in FIG. 13, the second member 234 covers the free edges of the pictures, i.e., those edges not engaged and supported by the clamp elements 232, and the accessible lower surface of the stack (preferably the back of the pictures). Pivot 220 can be formed by holes in either member 226 or 234 and pins integrally formed with the other member, the assembly taking place by means of elastic deformation of one or both members 226 or 234 to snap the pins in.

Figures 14, 15:
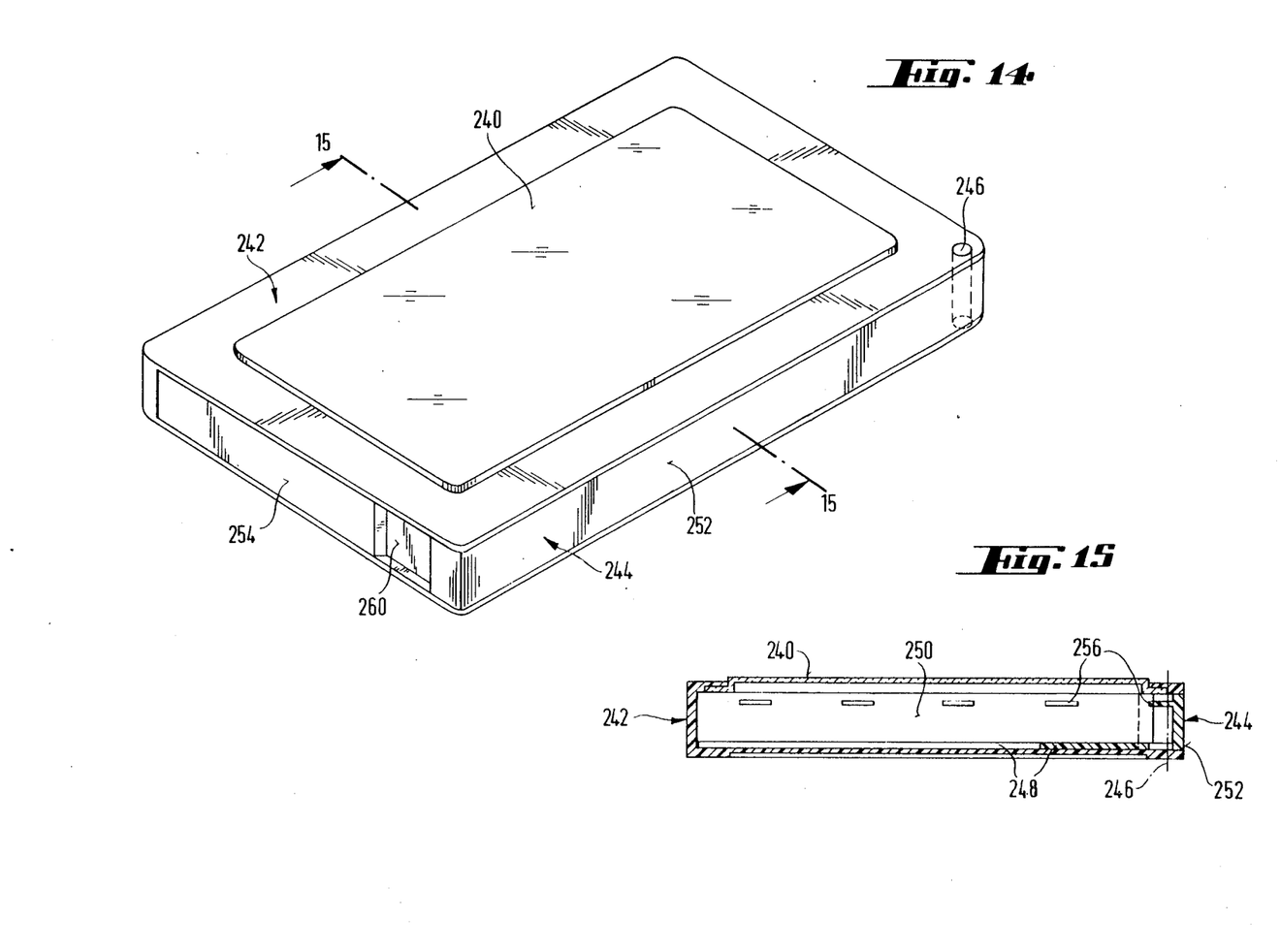
FIG. 14 is an isometric view of a sixth preferred embodiment.
FIG. 15 is a sectional end view of the sixth embodiment taken along line 15—15 of FIG. 14.
Figure 16:
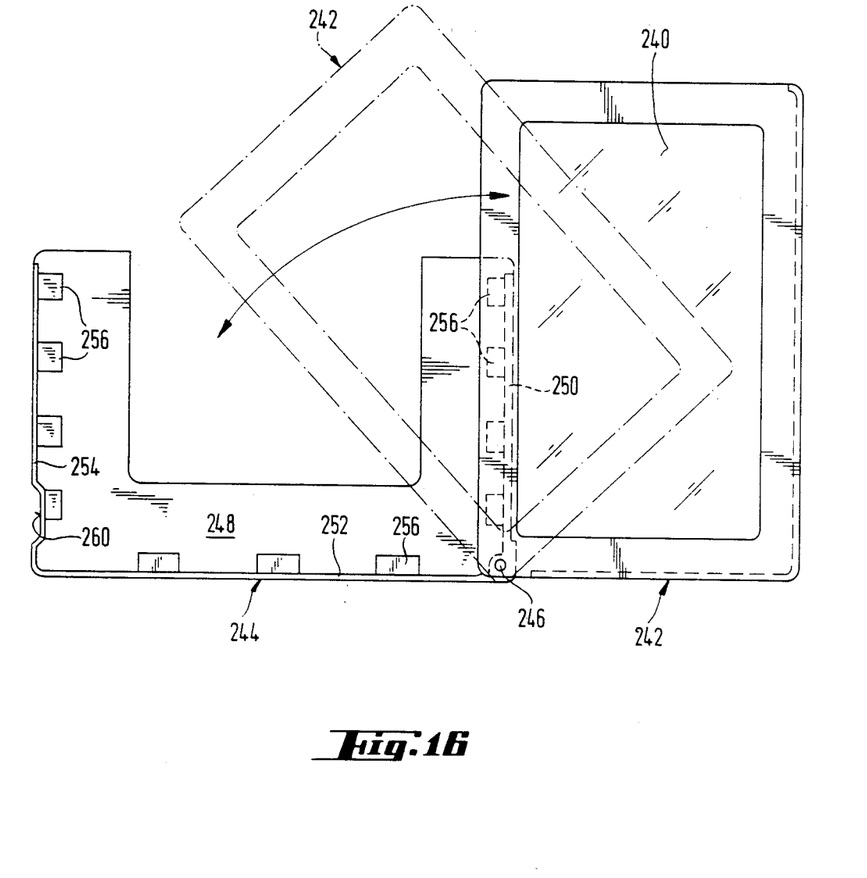
FIG. 16 is a top plan of the sixth embodiment showing the pivoting relationship between two portions of the container.

FIGS. 14–16 show another embodiment, comprising a housing 242 having a display window 240, and an inner member 244 having a U-shaped contour and connected with the housing 242 for pivoting about a pin 246 at one corner of housing 242. The inner member 244 comprises a plate 248 which, during pivoting, is guided along one housing wall, and orthogonally upstanding walls 250, 252, and 254. Extensions 256 on walls 250, 252 and 254 extend parallel to and spaced from plate 248, and point toward the center of plate 248. Extensions 256 together with the display window 240 (as shown in FIGS. 14 and 15) define a top chamber deep enough to accommodate a single picture, immediately below the display window 240 of housing 242. Extensions 256 serve as biasing or retention means to hold a picture against display window 240. The remaining stack of pictures fits into the space between extensions 256 and plate 248. An indentation 260 in wall 254 gives access for a finger tip, to facilitate pivoting the inner member 244 into and out of housing 242.

Figure 17:
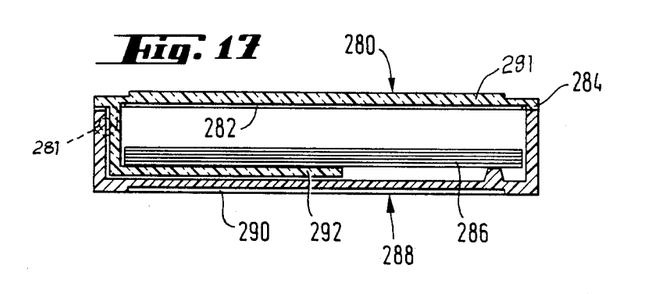
FIG. 17 is a sectional end view of a seventh preferred embodiment.
Figure 18:
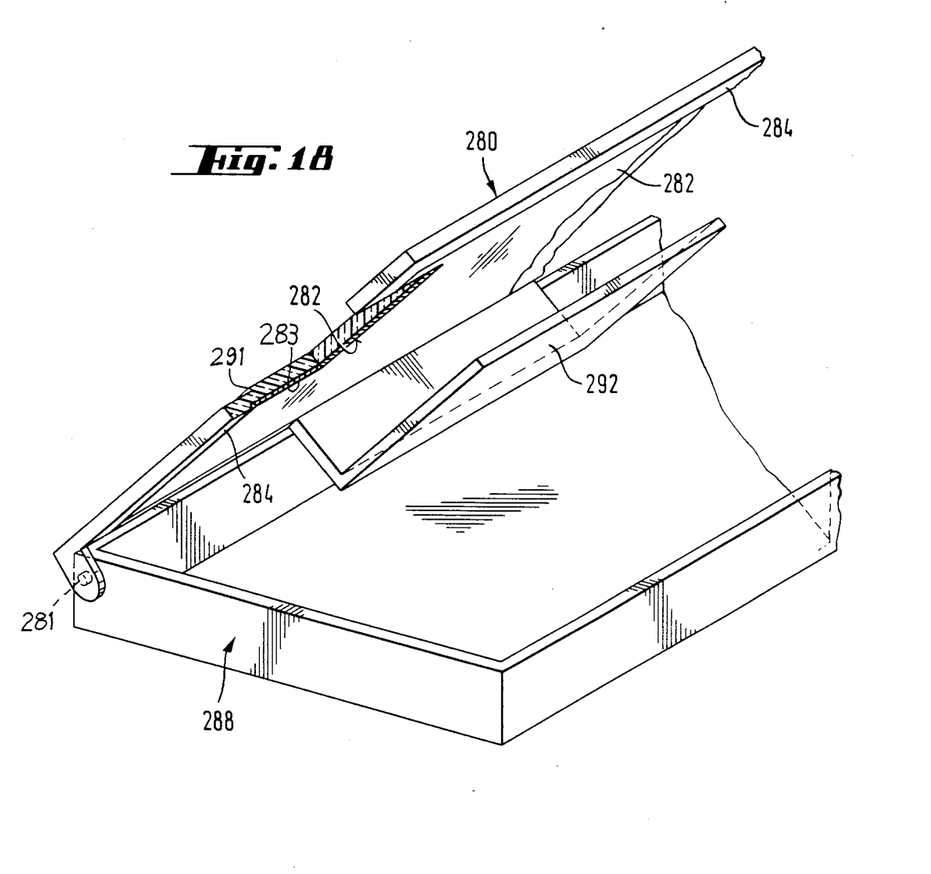
FIG. 18 is an isometric view, with a portion cut away, of part of the seventh embodiment.

FIGS. 17 and 18 show another embodiment of the invention similar to the embodiment of FIGS. 8 and 9 in that the one picture 282 of a stack 286 to be displayed is held flat against the inner surface of lid 280, which is made of a transparent plastic material, by a biasing or retention means made of a similarly transparent bonding agent. The picture 282 is received in a shallow recess 283 in lid 280, and downwardly extending edges 284 define the recess which embraces the edges of picture 282 and serves as a means for aligning that picture. The remainder of stack 286 is housed in the box-like bottom member 288, to which lid 280 is pivotally connected at 281. The remaining stack 286 is supported from beneath and embraced at one edge by bracket element 292 disposed on the underside of lid 280. This arrangement presents stack 286 to the user upon opening of the container. An indentation 290 is provided in the underside of bottom member 288, complementary to a raised section 291 of the transparent element 280, permitting the containers to be conveniently stacked.

Figure 19:
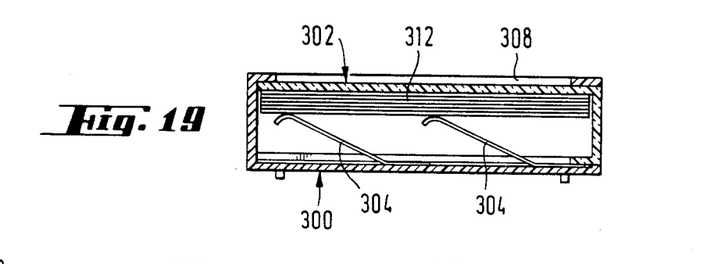
FIG. 19 is a sectional end view taken along line 20—20 of FIG. 21 of an eighth preferred embodiment in a closed position.
Figure 20:
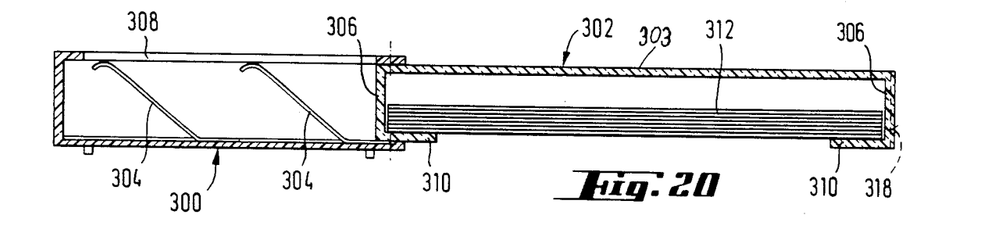
FIG. 20 is a sectional end view taken along line 20—20 of FIG. 21 of the eighth embodiment in an opened position.
Figure 21:
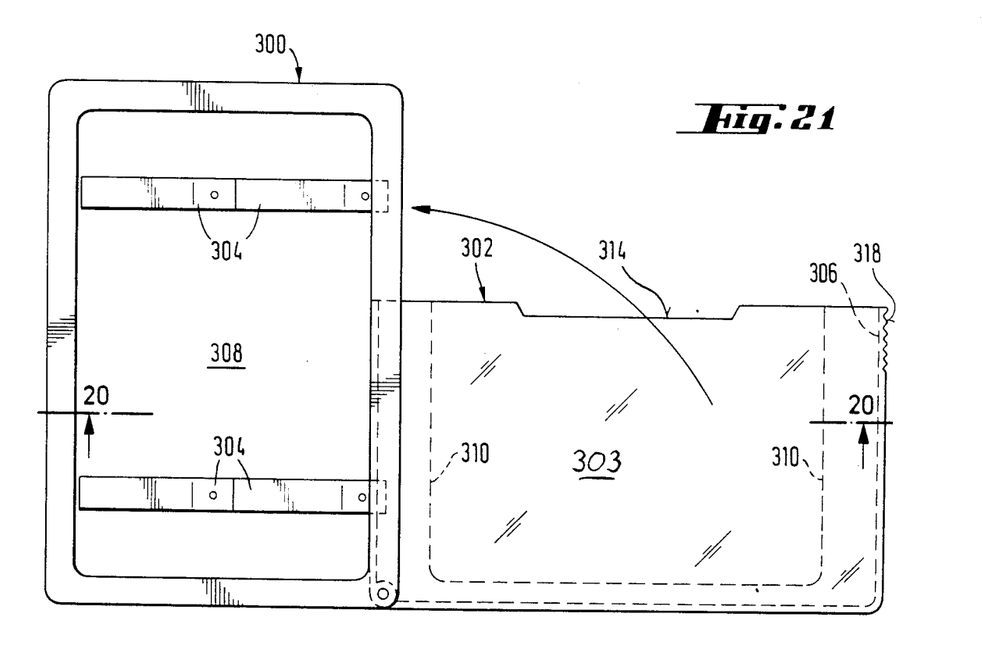
FIG. 21 is a top plan view of the eighth embodiment in the opened position.
Figure 22:
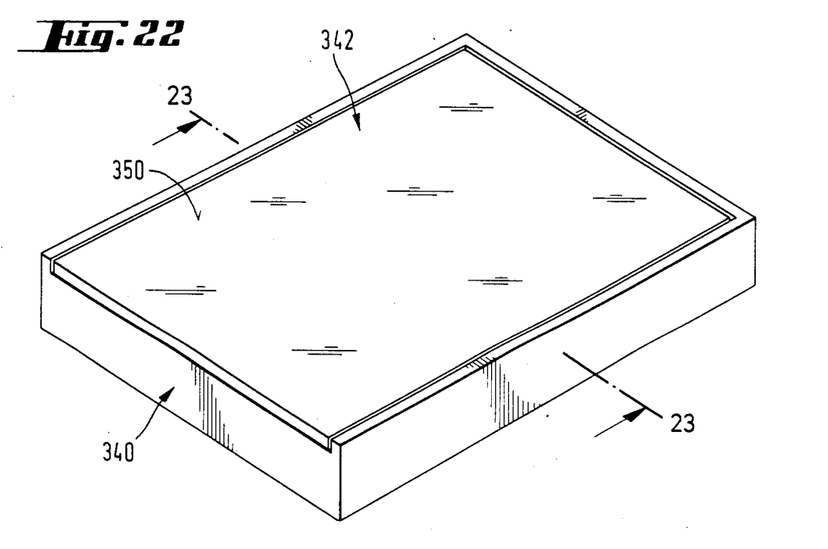
FIG. 22 is a perspective view of a ninth preferred embodiment in a closed position.

FIGS. 19–21 show an another embodiment comprising a housing 300 and an inner member 302 pivotally connected at one corner to housing 300 in such a manner as to be pivotable into and out of the housing 300. Springs 304, disposed on the floor of housing 300, point upward at an angle and serve as biasing devices to urge any pictures in the housing 300 upward against display window 308 in the top surface of the housing 300 (see FIG. 19). The inner member 302 comprises an upper plate 303 from three edges of which depends a vertical wall whose bottom edge has a flange or shank 310 extending toward the center of member 302. Seen from above, flange 310 is U-shaped. Flange 310 and the vertical wall together define angles 306 for embracing a stack 312 of pictures at two transverse edges and one longitudinal edge of the stack 312. Angles 306 are integrally formed with the inner member 302. Springs 304 engage or contact and therefore urge the entire stack 312, including its uppermost picture, against the display window opening 308.

As can be seen, stack 312 is embraced, as in the embodiment of FIGS. 14–16, at three of its four edges and can be removed easily at its accessible fourth edge. Removal is facilitated by an access indentation 314 in the open side of plate 303 of inner member 302. A locking mechanism, not illustrated in detail, is also provided. The transverse wall forming angle 306 of inner member 302 has a roughened contact area 318, located so as to remain exposed when the inner member 302 is pivoted into housing 300 (as in FIG. 19), to make it easier to pivot inner member 302 from housing 300.

Figure 23:
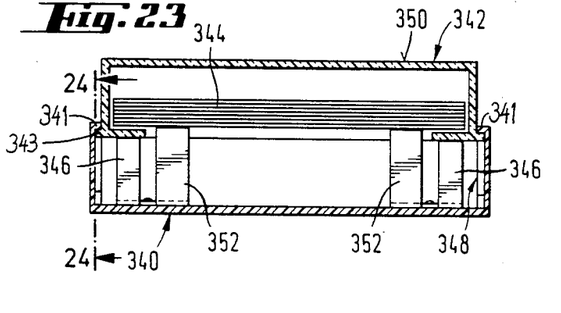
FIG. 23 is an end sectional view taken along line 23—23 of FIG. 22 showing the container of the ninth embodiment in an open position.
Figure 24:
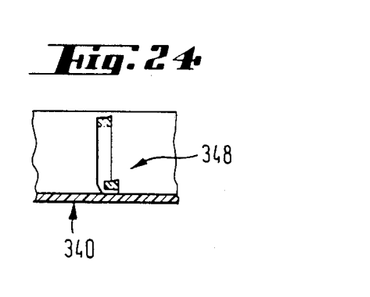
FIG. 24 is a view taken from line 24—24 of FIG. 23 showing the bayonet lock of the ninth embodiment.

Another preferred embodiment is shown in FIGS. 22–25. The container of this embodiment comprises a bottom member 340 and an inner member 342 slidably received in the bottom member 340 for relative motion in a direction perpendicular to the main plane of the pictures forming stack 344. This best may be seen in the sectional illustration of FIG. 23 showing a telescopic interengagement of small horizontal flanges 341 and 343 at the top of member 340 and at the bottom of inner member 342, respectively. The inner member 342 is biased from the bottom member 340 into the raised or open position illustrated in FIG. 23 by means of springs 346. In order to lock the container in the closed position shown in FIGS. 22 and 24, there is a bayonet lock 348, the design and operation of which is shown in FIG. 24.

Figure 25:
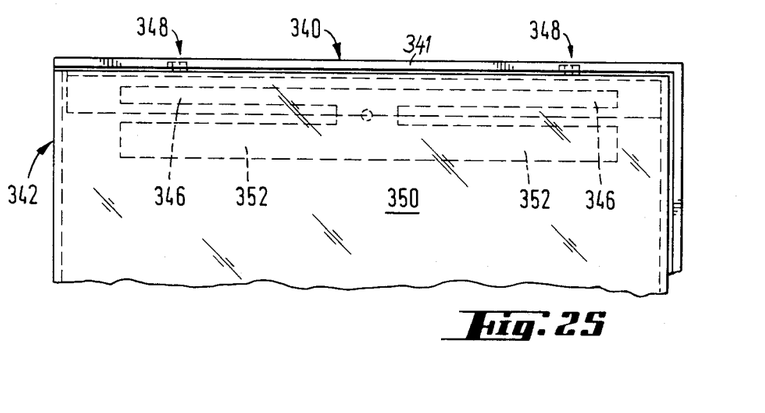
FIG. 25 is a top plan view of a portion of the ninth embodiment.

Springs 352 secured to member 340 serve as a biasing device for urging stack 344 upward against the cover face or window face 350 of inner member 342. Inner member 342 is molded totally of transparent plastic material. In the removal position of FIG. 23, springs 352 are relaxed so that stack 344 is loose and easily can be removed laterally, i.e., by movement out of the plane of the paper in FIG. 23. The two spring systems 346 and 352 can comprise outer and inner shanks of two parallel H-shaped integrally manufactured leaf springs each secured at its center to member 340, as shown in FIG. 25.

Figure 26:
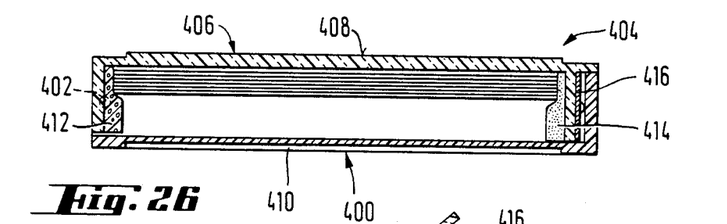
FIG. 26 is a sectional side view of a tenth preferred embodiment in a closed position.
Figure 27:
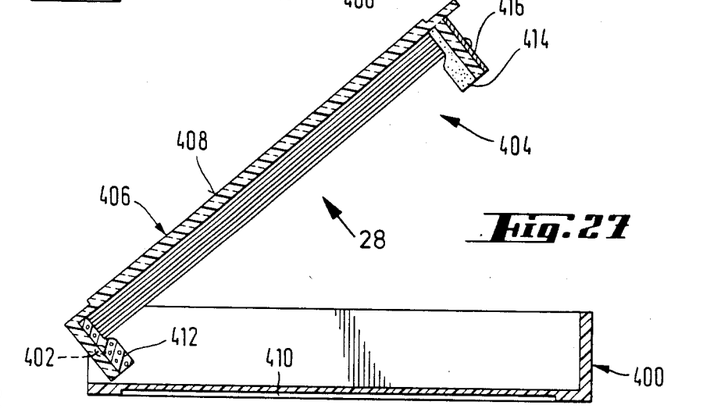
FIG. 27 is a sectional side view of the tenth embodiment in an opened position.
Figure 28:
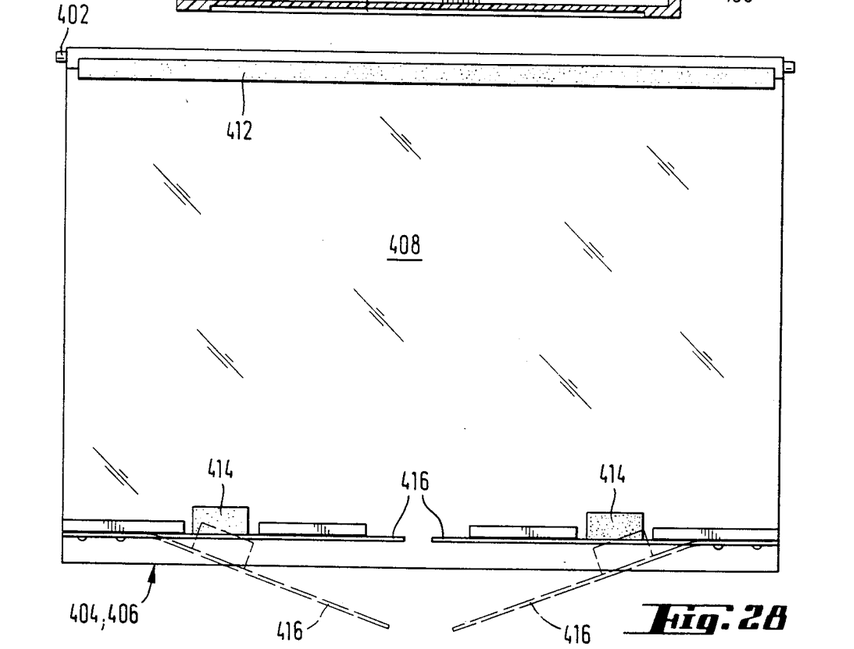
FIG. 28 is a top plan view of the bottom member of the tenth embodiment.

FIGS. 26–28 show another preferred embodiment, wherein the entire stack is embraced at two opposite edges by volume compressible elements. The container comprises a lower covering or bottom member 400 and a window member 404. The latter is a substantially U-shaped member 406 made of injection molded transparent plastic material, the arms of the 37 U" extending downward in FIG. 26. One arm of window member 404 is pivotably connected to member 400 at pivot 402.

The window member 404 has a raised display window portion 408 whose contour is complementary to an indentation 410 in the bottom side of bottom member 400. This permits stacking of identical containers as has been described for previous embodiments.

On the opposing inner walls of the arms of the window member 404, cushions or strips 412 and 414, respectively, made of a volume compressible material such as foamed plastic, are mounted, for example by gluing. As can be seen from the sectional views in FIGS. 26 and 27, the pictures of the stack, when placed between elements 412 and 414, are frictionally held so that there is no necessity for supporting or holding them at the edges of the pictures transverse to the inner walls of window member 406. As can be seen from FIG. 28, the cushions 414 are mounted on respective bar-shaped flaps 416, each of which is secured at one end to element 406 in such a manner as to be elastically deflectable into the position indicated in dashed lines to enable the stack to be removed.

Figure 29:
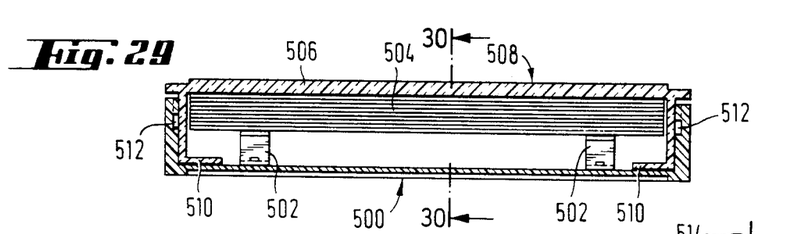
FIG. 29 is a sectional end view of an eleventh preferred embodiment.
Figure 30:
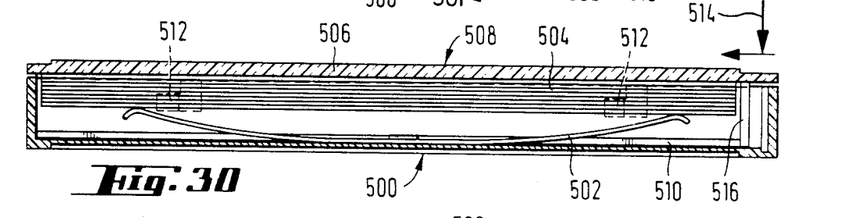
FIG. 30 is a sectional side view of the eleventh embodiment taken along line 30—30 of FIG. 29.
Figure 31:
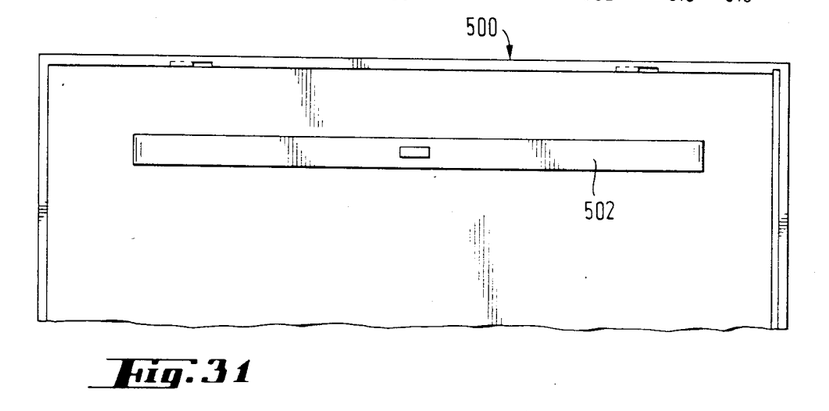
FIG. 31 is a top plan of a portion of the bottom container member of the eleventh embodiment.

FIGS. 29–32 show another embodiment, in which a spring system consisting of two arch-shaped leaf springs 502 is mounted at the bottom of a housing or container member 500 and urges a stack of pictures 504 upward against a display window 506. Springs 502 can be glued onto or integrally molded with member 500. Covering member 508 has angular arms 510 which depend from the undersurface of member 508 and have flanges 510 at the bottom to define brackets or angles to hold the stack of pictures. As shown in FIG. 29, each bracket or angle 510 is adjacent one spring 502, with the springs between angles 510. In order to hold the stack 504 against the display window 506, and the covering member 508 in the container member 500 in the position of FIGS. 29 and 30 against the bias of springs 502, the angular pieces 510 have cams 512 that can be inserted in complementary grooves of the housing member 500, and can then be locked by moving member 508 down and then transversely in the direction of arrows 514 in FIG. 30, to effect a bayonet type lock. Two such bayonet locks are placed on each of two opposite sides of the container. Their positions and those of the springs 502 relative to members 500 and 508 can be seen from FIG. 31.

Figure 32:
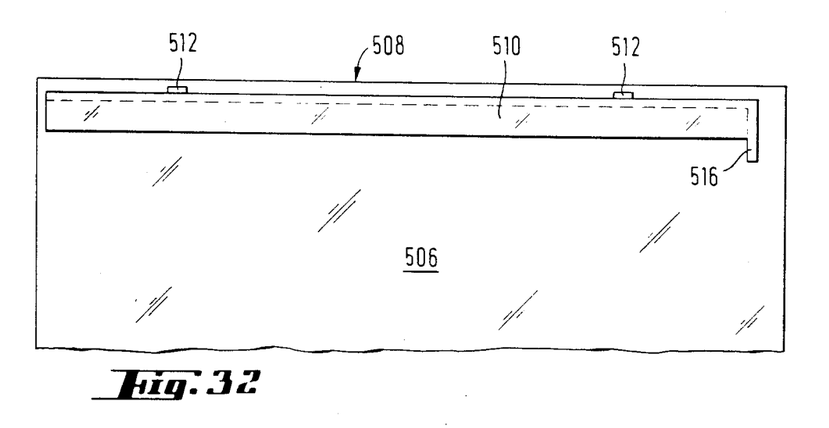
FIG. 32 is a top plan of a portion of the covering member of the eleventh embodiment.

FIG. 32 is a view of part of the underside of the member 508 having the window 506. At one end of each of the angular members 510 is a transverse panel or angle 516, so that the stack 504 is embraced at three of its edges, allowing for removal at its fourth edge after unlocking of the bayonet locks to release the two members 500 and 508 of the container from each other.

FIGS. 33–36 illustrate another preferred embodiment, in which a lower member 600 having a bottom and three side walls is pivotably connected to an upper member 604 by means of a hinge joint 602. Upper member 604 comprises a display window 606, a panel 605 depending from one edge of window 606 and a horizontal extension 610 from the lower portion of the depending panel. The extension 610 comprises a relatively narrow shelf along the depending panel 605 (see FIGS. 33 and 34) and tongues 611 separated by gaps 614 and extending toward the interior of the container. The extension 610, with panel 605, defines a bracket that supports a stack of pictures 608 and embraces the stack and at one edge only.

Figure 33:
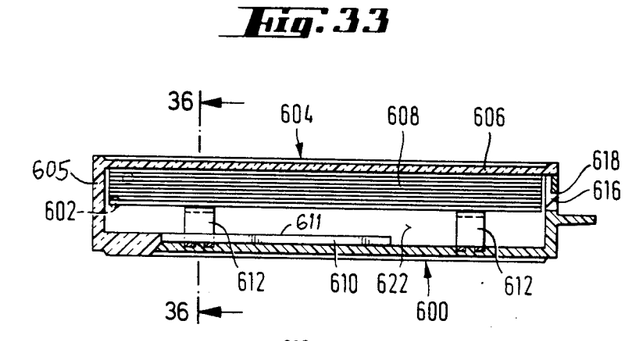
FIG. 33 is a sectional end view of a twelfth preferred embodiment in a closed position taken along line 33—33 of FIG. 36.
Figure 34:
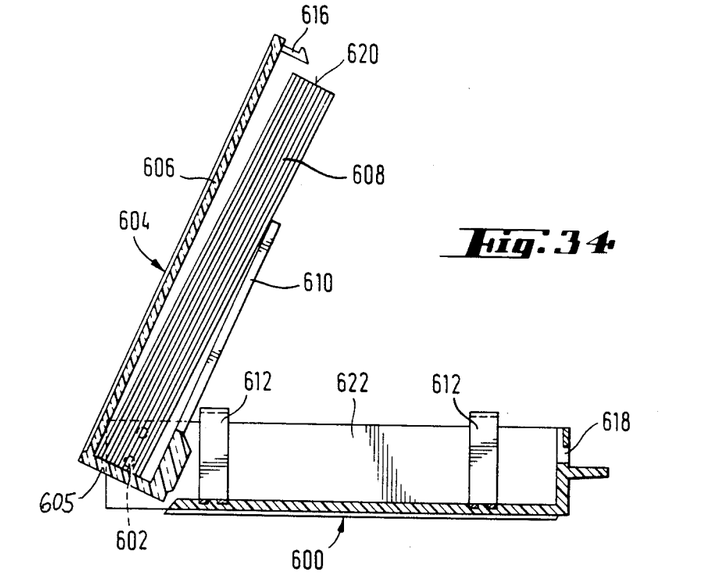
FIG. 34 is a sectional end view of the twelfth embodiment in an open position.
Figure 35:
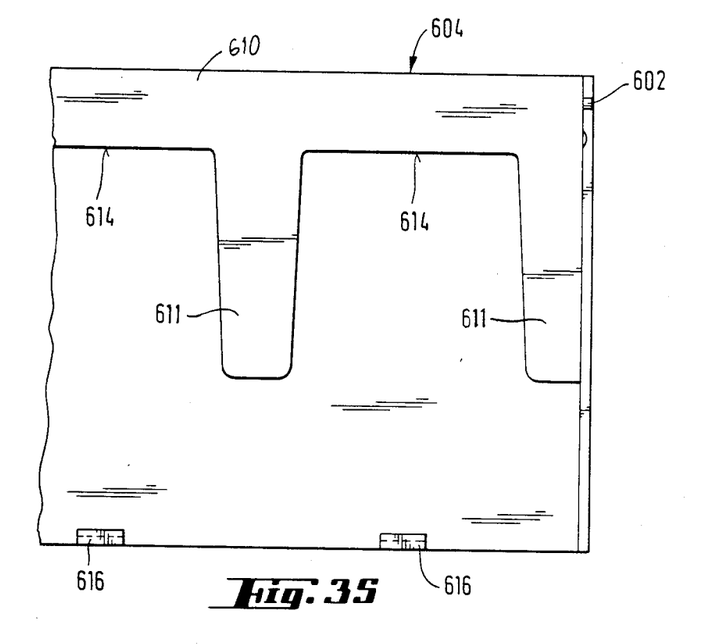
FIG. 35 is a top plan view of a portion of the upper member of the twelfth embodiment.
Figure 36:
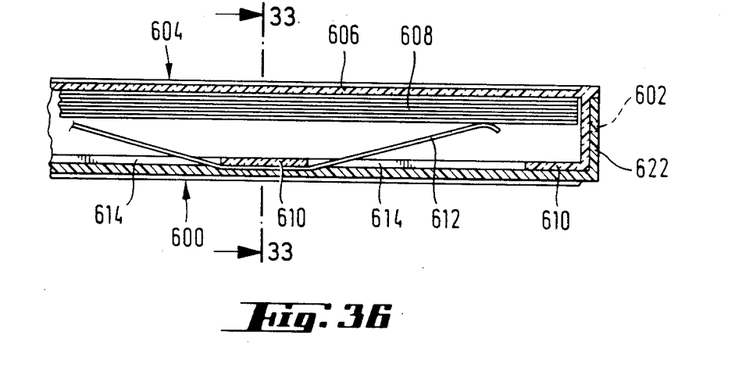
FIG. 36 is a side view taken along line 36—36 of FIG. 33 of the twelfth embodiment.

The lower member 600 has leaf springs 612 mounted thereon to urge the stack 608 upward against window 606 when the container is closed (see FIGS. 33 and 36). The free ends of the springs 612 project upward between the extension tongues 611, as can be seen from FIG. 36. The container can be locked closed by means of a hook 616 at the edge of member 604 opposite joint 602 engaging an opening 618 in the lower member 600. Stack 608 is supported in both open and closed positions at the two stack edges perpendicular to edge 620 by upstanding walls 622 of the container lower member 600. Therefore, after opening the container (FIG. 34), the user removes the stack of pictures 608 by sliding and lifting the stack in the direction of stack edge 620, i.e., away from pivot 602.

In each embodiment described above wherein the container comprises two members which are movable relative to each other between a closed and an open position, it is possible to bias the members into either the open or the closed position by means of a spring and to lock them in the other of those positions by a mechanism that can be manually disabled. Further, in all embodiments, it may be generally desired to display the picture at the window with no peripheral parts of the picture obscured. If, however, for esthetic reasons, a frame about the display window is desired, stop means can be provided in the container for aligning the picture within a frame in the window.

In all embodiments, and not only in those embodiments where such features have already been mentioned, stand-up feet, or holes for hanging the container up on the wall as a frame (in either the longitudinal or the transverse orientation), or both, can be provided.

Finally, in most of the embodiments described, it is possible to provide, at one end or side wall of the container transverse to the display window, a label to identify the contents, and to design the containers to enable them to be stacked upon each other when closed.

I claim:

1. A container for accommodating a stack comprising a variable number of pictures, said container comprising an engagement member and a housing member, one of said members having a display window, and one of said members being movable relative to the other between a closed relative position and an open relative position; and a biasing device for urging at least one picture of a stack of pictures against said display window; said engagement member including picture-support means for engaging at least one and at most three edges of a stack of pictures in said container, said picture-support means being arranged such that, when said members are in said open position, the stack is accessible for removal from the container in a direction toward an edge not engaged by said picture-support means, and said picture-support means being shaped to limit motion of a stack in either direction perpendicular to the planes of the image-bearing surface of each picture of the stack, when said members are in said open position.

2. A container as set forth in claim 1, wherein said two members are pivotable with respect to each other.

3. A container as set forth in claim 1, wherein said two members are linearly movable with respect to each other.

4. A container as set forth in claim 2, wherein said container has a substantially block-shaped form having a longest block side and a shortest block side, and wherein said two members are relatively pivotable with respect to each other about an axis extending parallel to the longest block side.

5. A container as set forth in claim 2, wherein said container has a substantially block-shaped form having a longest block side and a shortest block side, and wherein said two members are relatively pivotable about an axis extending parallel to the shortest block side.

6. A container as set forth in claim 3, wherein said two members are relatively slidable with respect to each other in a direction perpendicular to the planes of the pictures in a stack supported by said picture-support means.

7. A container as set forth in claim 6, wherein said two members interengage telescopically.

8. A container as set forth in claim 6, wherein said two members are movable relative to each other into said closed relative position by a sequence of two relative motions which are made in two directions orthogonal to each other.

9. A container as set forth in claim 1, wherein one of said members has a stop edge to align at least one picture with respect to said display window by engaging those edges of that picture which are not held by either said member.

10. A container as set forth in claim 1, wherein said engaging member has a window pane that serves as said display window.

11. A container as set forth in claim 1, wherein said biasing device comprises elastic elements.

12. A container as set forth in claim 11, wherein said biasing device holding said stack comprises volume compressible strips.

13. A container as set forth in claim 1, wherein said biasing device comprises springs.

14. A container as set forth in claim 13, wherein said springs are disposed in one of said members and are relaxed when said members are in said open position.

15. A container as set forth in claim 1, wherein said display window includes a transparent pane, and wherein said biasing device comprises a transparent bonding layer on one side of said pane adjacent the picture to be presented at said window, for securing the picture to said pane.

16. A container as set forth in claim 1, wherein said biasing device comprises separating elements defining, adjacent said display window, a shallow chamber dimensioned to accommodate only one picture, and a second chamber adjacent said shallow chamber for the accommodation of at least one additional picture; said picture-support means also engaging at least one edge of a picture in said shallow chamber.

17. A container as set forth in claim 1, having at least one hole to enable said container to be used as a wall frame.

18. A container as set forth in claim 1, wherein said container is stackable with identical containers.

19. A container as set forth in claim 1, wherein said container has a side wall transverse to said display window, and further comprising a label on said side wall.

20. A container as set forth in claim 1, further comprising a stand-up foot.

21. A container as set forth in claim 1, wherein said biasing device is in said engagement member.

22. A container as set forth in claim 1, wherein said housing member and said engagement member are formed integrally with each other.

23. A container as set forth in claim 1, wherein said biasing device and said picture-support means are so arranged as to enable a picture urged against said display window by said biasing device to be removed from said container without disordering other pictures in said container.

24. A container for pictures, said container comprising an engagement member and a housing member, one of said members having a window and having a bonding means on a portion of said one of said members for holding a picture at said window for display through said window, and one of said members being movable relative to the other between a closed relative position and an open relative position; and one of said members having picture-support means for accommodating at least one picture, said picture-support means being so arranged as to support a picture at at least one and not more than three edges of such picture and to permit removal of such picture from said picture-support means in a direction toward an edge of such picture not supported by said picture support means, said picture-support means further being so shaped as to limit movement of a stack of pictures in either direction perpendicular to the plane of the image-bearing surface of each picture of the stack, when said members are in said open position.

* * * * *